United States Patent
Kim et al.

(10) Patent No.: US 9,431,659 B2
(45) Date of Patent: Aug. 30, 2016

(54) ELECTRODE BINDER FOR SECONDARY BATTERY AND ELECTRODE FOR SECONDARY BATTERY COMPRISING THE SAME

(71) Applicant: LG CHEM, LTD., Seoul (KR)

(72) Inventors: Jang Bae Kim, Daejeon (KR); Im Goo Choi, Daejeon (KR); Byoung Bae Lee, Daejeon (KR); Woo Ha Kim, Daejeon (KR); Bong Hyun Jeong, Daejeon (KR); Kyoung Hun Kim, Daejeon (KR); Ji Hye Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 119 days.

(21) Appl. No.: 14/341,023

(22) Filed: Jul. 25, 2014

(65) Prior Publication Data

US 2015/0030921 A1  Jan. 29, 2015

(30) Foreign Application Priority Data

Jul. 26, 2013  (KR) .................. 10-2013-0089000
Jul. 22, 2014  (KR) .................. 10-2014-0092644

(51) Int. Cl.
  *H01M 4/62*    (2006.01)
  *H01M 4/133*   (2010.01)
  *H01M 10/42*   (2006.01)
  *H01M 4/131*   (2010.01)
  *H01M 4/1391*  (2010.01)
  *H01M 10/052*  (2010.01)

(52) U.S. Cl.
  CPC ............. *H01M 4/622* (2013.01); *H01M 4/628* (2013.01); *H01M 10/4235* (2013.01); *H01M 4/131* (2013.01); *H01M 4/1391* (2013.01); *H01M 10/052* (2013.01); *Y02T 10/7011* (2013.01)

(58) Field of Classification Search
  CPC ....... H01M 4/62; H01M 4/621; H01M 4/622
  See application file for complete search history.

(56) References Cited

U.S. PATENT DOCUMENTS

2013/0034651 A1    2/2013   Buqa et al.
2013/0171484 A1*   7/2013   Baginska ............ H01M 10/056
                                                    429/62
2016/0013492 A1    1/2016   Buqa et al.

FOREIGN PATENT DOCUMENTS

KR       10-1190364 B1    10/2012
KR    10-2013-0016061 A    2/2013

OTHER PUBLICATIONS

Bruce P. Lee, P.B. Messersmith, J.N. Israelachvili, and J.H.Waite. Mussel-Inspired Adhesives and Coatings, Annu. Rev. Mater. Res. (2011) 41:99-132.*
Lee et al., "A reversible wet/dry adhesive inspired by mussles and geckos," Nature, vol. 448, Jul. 19, 2007, pp. 338-341.
Lee et al., "Mussel-Inspired Adhesives and Coatings", Annu Rev Mater Res. Aug. 1, 2011; 41: pp. 1-55.
Lee, et al., "Mussel-Inspired Surface Chemistry for Multifunctional Coatings", Science, vol. 318, Oct. 19, 2007, pp. 426-430.

* cited by examiner

*Primary Examiner* — Carlos Barcena
(74) *Attorney, Agent, or Firm* — Birch, Stewart, Kolasch & Birch, LLP

(57) ABSTRACT

Provided are an electrode binder for a secondary battery including an amine-based compound expressed by Chemical Formula 1 below and water-based binder particles including at least one carboxyl group as an end group, a method of preparing the same, and an electrode for a secondary battery including the electrode binder for a secondary battery

[Chemical Formula 1]

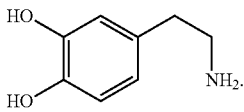

14 Claims, 5 Drawing Sheets

ELECTRODE BINDER FOR SECONDARY BATTERY AND ELECTRODE FOR SECONDARY BATTERY COMPRISING THE SAME

CROSS-REFERENCE TO RELATED APPLICATIONS

This application claims the priority of Korean Patent Application No. 10-2013-089000 filed on Jul. 26, 2013, in the Korean Intellectual Property Office, the disclosure of which is incorporated herein by reference.

BACKGROUND OF THE INVENTION

1. Field of the Invention

The present invention relates to an electrode binder for a secondary battery having improved bonding force, an anode for a secondary battery including the same, and a lithium secondary battery including the anode.

2. Description of the Related Art

Recently, in line with the realization of miniaturization and weight reduction in electronic devices and the generalization of the use of portable electronic devices, research into lithium secondary batteries used as power sources of such electronic devices has been actively conducted.

In general, a lithium secondary battery includes an anode using a copper current collector, a cathode using an aluminum current collector, and a separator disposed therebetween.

Resistance may increase and the performance of a battery may be deteriorated while an electrode active material is exfoliated from an electrode current collector due to volume changes in the anode and cathode during repetitive charge and discharge of the secondary battery. In particular, such an exfoliation phenomenon may more frequently occur in the anode, in which the deformation of an active material layer due to expansion and shrinkage is large, than in the cathode.

Typically, a polymer binder, such as polyvinylidene fluoride (PVdF), has been used for improving binding force between electrode active material particles or between the electrode active material particles and a current collector. The binding force between a separator formed of a material similar to the binder and an electrode active material layer may increase during the charge and discharge are repeated, but the binding force between an electrode current collector formed of a material different from the binder and an electrode active material layer may still be low. When the amount of the binder is increased to prevent this, the amount of the electrode active material may not only be relatively decreased, but electrical resistance of an electrode may also be increased due to electrical insulation. Thus, capacity of the battery may be reduced.

Therefore, the development of a binder for a secondary battery, which may secure adhesion between the electrode active material and the electrode current collector and may simultaneously prevent the reduction of the performance of the battery, is urgently needed.

SUMMARY OF THE INVENTION

An aspect of the present invention provides an electrode binder for a secondary battery having improved bonding force and a method of preparing the same.

Another aspect of the present invention provides an anode including the electrode binder for a secondary battery and a lithium secondary battery including the anode.

According to an aspect of the present invention, there is provided an electrode binder for a secondary battery comprising: an amine-based compound expressed by Chemical Formula 1; and water-based binder particles including at least one carboxyl group as an end group:

[Chemical Formula 1]

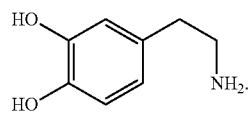

According to another aspect of the present invention, there is provided a method of preparing an electrode binder for a secondary battery comprising: reacting a coupling agent with water-based binder particles including at least one carboxyl group as an end group in a weak acidic solution to activate the carboxyl group of the water-based binder particles; dissolving an amine-based compound expressed by Chemical Formula 1 in a distilled water-based buffer solution; and mixing the carboxyl group-activated water-based binder particles and the solution of the amine-based compound expressed by Chemical Formula 1 to prepare water-based binder particles to which the amine-based compound expressed by Chemical Formula 1 is coupled.

According to another aspect of the present invention, there is provided an anode for a secondary battery comprising: a binder for a secondary battery prepared by the above method, an electrode active material, and a conductive agent.

According to another aspect of the present invention, there is provided a lithium secondary battery comprising the anode for a secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION OF THE PREFERRED EMBODIMENT

Figure 1A:
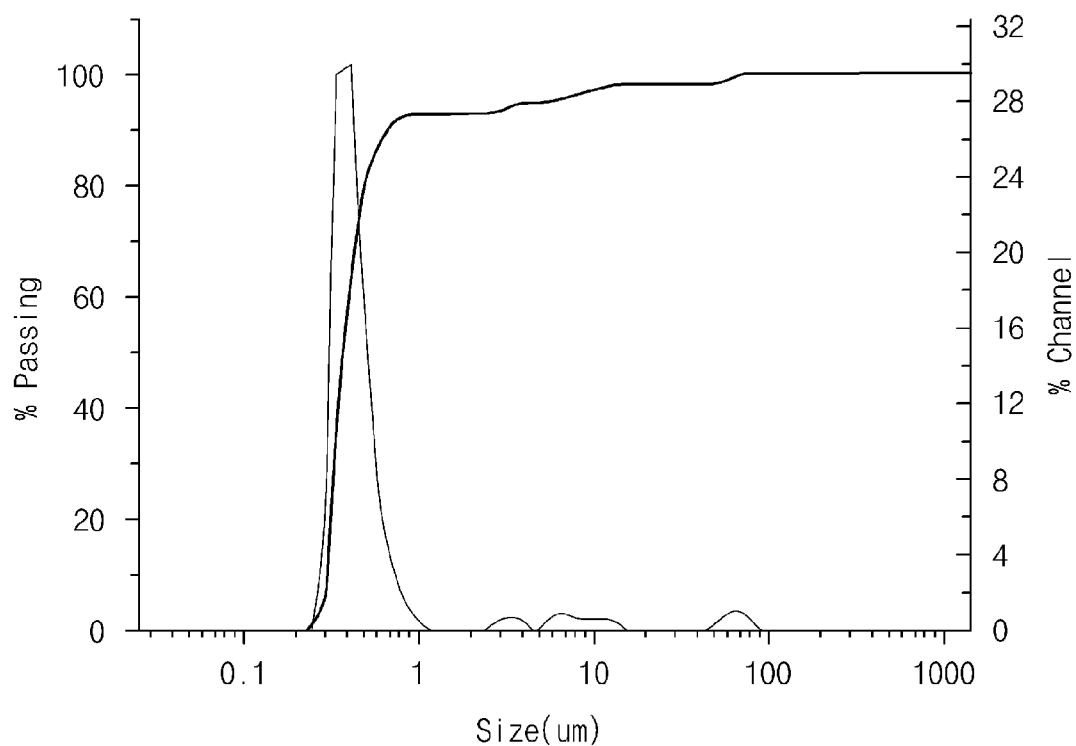
FIG. 1A is a graph illustrating particle size distribution of surface-modified water-based binder particles of Example 1 in which a purification process is not performed, according to the present invention.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Recently, an environmentally-friendly method has emerged, in which an electrode active material, a water-based binder such as styrene-butadiene rubber (SBR), and a thickener are polymerized in water and used during the preparation of an electrode for a secondary battery, for example, an anode. However, with respect to the SBR binder, since binding force is relatively low, an effect of improving the exfoliation of an electrode active material layer from an electrode current collector during repetitive charge and discharge is insignificant.

Thus, according to an embodiment of the present invention, an electrode binder for a secondary battery comprising an amine-based compound expressed by Chemical Formula 1 below and water-based binder particles including at least one carboxyl group as an end group is provided as an electrode binder for a secondary battery connecting between electrode active material particles and between the electrode active material particles and an electrode current collector.

[Chemical Formula 1]

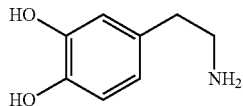

The amine-based compound expressed by Chemical Formula 1 may be included and coupled to surfaces of the water-based binder particles.

The amine-based compound expressed by Chemical Formula 1 may be a dopamine-group containing compound including chemical components of catechol and amine. In general, it is known that the dopamine group provides hydrophilicity to all base materials, such as metal, glass, or a resin, regardless of surface properties under a basic (pH>7) aqueous solution condition due to its inherent molecular structural characteristics (see (1) B. P. Lee et al., Annu. Rev. Mater. Res. 41, 99(2011); and (2) Lee et al., Science 318, 426 (2007)).

In the present invention, since the dopamine group is introduced as an end substituent of the water-based binder particles, surface hydrophilicity of the binder is improved. Thus, dispersibility of the binder in an electrode slurry may not only be increased, but also the agglomeration between the particles may be minimized and in particular, the bonding force between the electrode current collector and the electrode active material slurry may be improved.

In the electrode binder for a secondary battery of the present invention, the water-based binder particles may be used without limitation as long as they are a polymer compound including at least one carboxyl group as an end group among water-based binder particles typically used in the preparation of a lithium secondary battery, and for example, may include a polymer compound including at least one repeating structural unit composed of a vinyl group as well as at least one carboxyl group as an end group. Specifically, examples of the polymer compound including the repeating structural unit composed of a vinyl group may be a single material selected from the group consisting of an acrylonitrile-butadiene rubber, a styrene-butadiene rubber, and an acrylic resin, or a mixture of two or more thereof.

In this case, as the water-based binder particles, a polymer compound including at least one repeating structural unit composed of a heterocyclic group as well as at least one carboxyl group as an end group may also be used. Examples of the polymer compound including the repeating structural unit composed of a heterocyclic group may be compounds containing at least one —$CH_2OH$ group or —$CH_2OCH_2COOH$ group at position "α", and specific examples thereof may be a single material selected from the group consisting of hydroxyethyl cellulose and carboxymethyl cellulose, or a mixture of two or more thereof.

Also, a diameter of the water-based binder particles of the present invention may be in a range of 300 nm to 500 nm.

Furthermore, in the electrode binder for a secondary battery of the present invention, a combination ratio (number) of the water-based binder particles:the amine-based compound expressed by Chemical Formula 1 that is coupled to the water-based binder particles is in a range of about 1:4,000 to about 1:6,000 and may be 1:5,000. In the case that the number of the compound expressed by Chemical Formula 1 that is coupled to one water-based binder particle is less than 4,000, an effect of dispersing binder particles in a reaction slurry and an effect of increasing adhesion between the electrode active material and the current collector may not be expected. In the case in which the number of the compound expressed by Chemical Formula 1 that is coupled to one water-based binder particle is 6,000 or more, a side reaction may not only occur during the preparation of binder particles, but agglomeration between the prepared electrode binder particles for a secondary battery may also occur. Thus, the efficiency of the electrode binder may be reduced.

Specifically, the amine-based compound expressed by Chemical Formula 1 that is coupled to the water-based binder particles may be included in an amount of about 8 wt % to about 10 wt % based on a total weight of monomers constituting the water-based binder particles.

Also, according to an embodiment of the present invention, as illustrated in the following Reaction Formula 1, provided is a method of preparing an electrode binder for a secondary battery comprising:

reacting a coupling agent with water-based binder particles including at least one carboxyl group as an end group in a weak acidic solution to activate the carboxyl group of the water-based binder particles;

dissolving an amine-based compound expressed by Chemical Formula 1 in a distilled water-based buffer solution; and mixing the carboxyl group-activated water-based binder particles and the solution of the amine-based compound expressed by Chemical Formula 1 to prepare water-based binder particles to which the amine-based compound expressed by Chemical Formula 1 is coupled.

[Reaction Formula 1]

In Reaction Formula 1, A is a polymer compound including at least one repeating structural unit composed of a vinyl group as well as at least one carboxyl group as an end group, and specifically, A may include a vinyl group-containing polymer compound including a single material selected from the group consisting of an acrylonitrile-butadiene rubber, a styrene-butadiene rubber, and an acrylic resin, or a mixture of two or more thereof.

In the method of the present invention, 1-ethyl-3-(3-dimethylaminopropyl)-carbodiimide (EDC) and N-hydroxysuccinimide (NHS) may be used as the coupling agent.

Also, in the method of the present invention, a molar ratio of the coupling agent:the amine-based compound expressed by Chemical Formula 1 may be in a range of 1:1 to 2:1.

Furthermore, in the method of the present invention, the mixing of the solution of the amine-based compound expressed by Chemical Formula 1 and the carboxyl group-activated water-based binder particles may be performed under weak acidic conditions using water as a reaction solvent, for example, at a pH value of 3 to 6, in order to suppress self-polymerization reaction of the amine-based compound expressed by Chemical Formula 1.

Since water is used as a reaction solvent in the mixing of the solution of the amine-based compound expressed by Chemical Formula 1 and the water-based binder particles, it is not only environmentally-friendly, but also various surfaces may be coated regardless of organic/inorganic base materials and a coating thickness may be easily adjusted. Furthermore, since the internal resistance of the electrode may not be increased even in the case in which such a substituent is added, there is no significant effect on the reduction of cell performance.

Also, in the mixing of the solution of the amine-based compound expressed by Chemical Formula 1 and the carboxyl group-activated water-based binder particles in the method of the present invention, molecules of the amine-based compound expressed by Chemical Formula 1 may be added in an equivalent of about 400,000 to about 600,000 to 1 equivalent of the water-based polymer particles and mixed, in order that the number of the amine-based compound expressed by Chemical Formula 1 that is coupled to one water-based binder particle may be in a range of about 4,000 to about 6,000. For example, 0.1 mmol of the amine-based compound expressed by Chemical Formula 1 may be added based on 10 ml of the carboxyl group-activated water-based binder particle solution, and accordingly, a final molar concentration of the amine-based compound expressed by Chemical Formula 1 becomes 0.01 M (=0.1 mmol/10 ml). That is, 0.1 mmol of the amine-based compound expressed by Chemical Formula 1 corresponds to an amount by which about 500,000 molecules of the compound expressed by Chemical Formula 1 may react with one water-based binder particle, and when a reaction efficiency is assumed to be 1%, about 5,000 molecules of the amine-based compound of Chemical Formula 1 may be coupled to one water-based binder particle.

In this case, when the amount of the amine-based compound expressed by Chemical Formula 1 used is less than 400,000 equivalents, the reaction efficiency between the amine-based compound expressed by Chemical Formula 1 and the surface of the water-based polymer is reduced. Thus, it is expected that an effect of improving the bonding force of the binder may be reduced because an appropriate number of the amine-based compound expressed by Chemical Formula 1 may not be coupled to the surface of the water-based polymer.

Also, after the completion of the coupling reaction, purifying for removing the unreacted coupling agent and amine-based compound expressed by Chemical Formula 1 may be selectively performed in the method of the present invention. However, in the case in which the amount of the amine-based compound expressed by Chemical Formula 1 used is excessive at 600,000 equivalents or more, a significant amount of the amine-based compound expressed by Chemical Formula 1 remains in the reaction solvent after the completion of the reaction, and thus, side reactions may occur in the battery. Therefore, since the purifying should be included as an essential step, the method may be complicated.

Figure 1B:
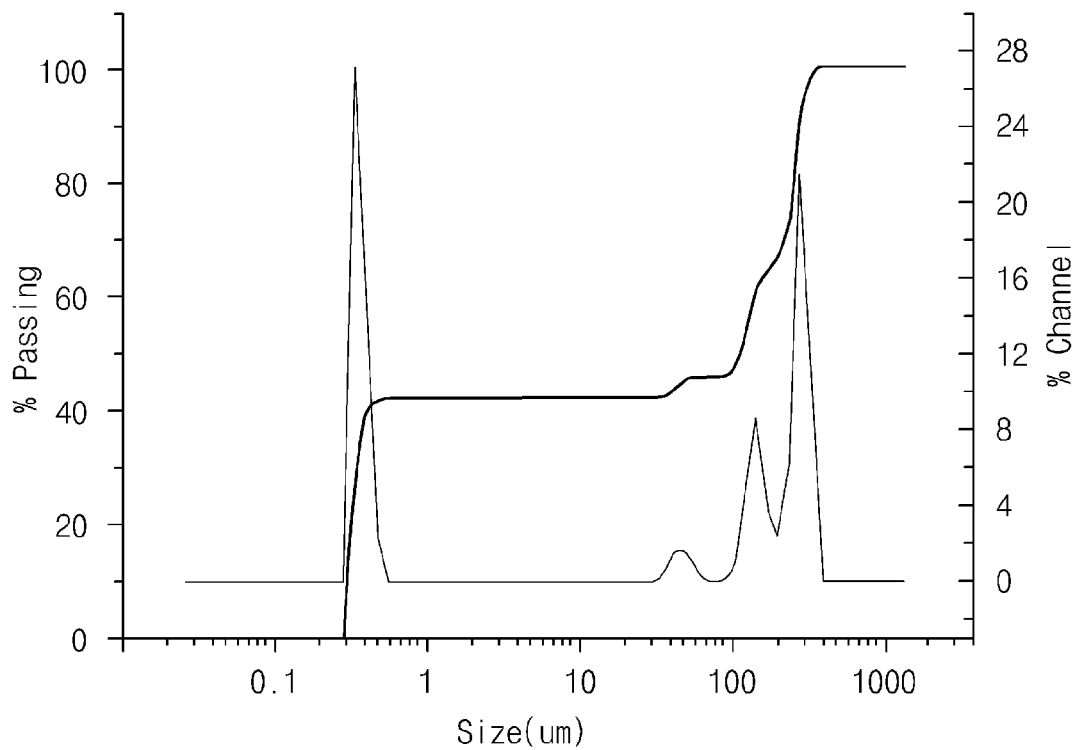
FIG. 1B is a graph illustrating particle size distribution of surface-modified water-based binder particles of Example 2 in which a purification process is performed, according to the present invention.
Figure 1C:
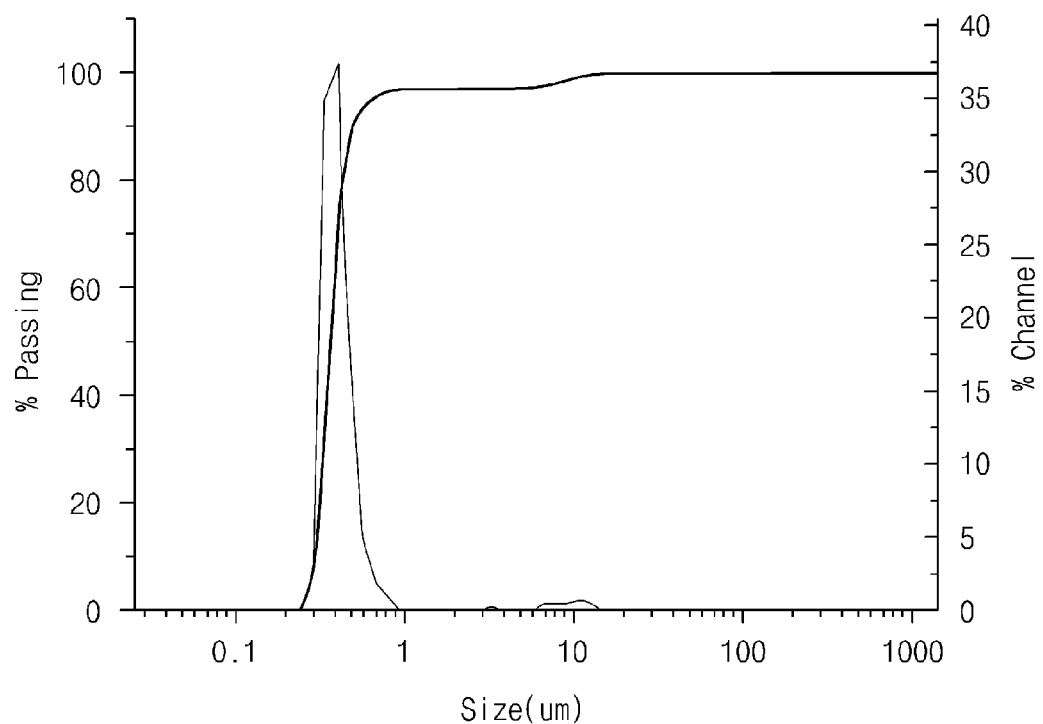
FIG. 1C is a graph illustrating particle size distribution of non-surface-modified water-based binder particles of Comparative Example 1.

The purifying may be performed by a dialysis method using a membrane or a centrifugation method. Since the dialysis method must be performed for a long period of time, there is a difficulty in removing a large amount of solvent in a final concentration step. Also, in a case where the centrifugation method is performed, processes of washing unreacted reactants, precipitation by centrifugal force, and removal must be repeated, and in this case, aside reaction may occur in which particles are agglomerated together due to mutual physical adsorption between the water-based binder particles. Thus, binder particles for a secondary battery having a non-uniform particle size distribution may be formed. Water-based binder particles before surface modification (see FIG. 1C) and water-based binder particles of the present invention unpurified after the surface modification using the amine-based compound expressed by Chemical Formula 1 (see FIG. 1A) have a uniform particle size distribution in which average particle diameters thereof are in a range of 0.5 µm to 1 µm. In contrast, with respect to water-based binder particles subjected to the purification process, it is confirmed that since the water-based binder particles are agglomerated together while both physical and chemical bonding occur between the surfaces of the particles, the water-based binder particles have a non-uniform particle size distribution in which an average particle diameter is in a range of about 0.5 µm to about 1 µm and about 50 µm to about 500 µm (see FIG. 1B)

Therefore, in the present invention, a reaction mixture of the solution of the amine-based compound expressed by Chemical Formula 1 and the carboxyl group-activated water-based binder particles may be used as it is in the subsequent electrode preparation without going through the purification step if possible, in order to further improve the dispersibility of the binder in the electrode slurry and the adhesion between the electrode current collector and the electrode active material slurry. For this, it is desirable that the unreacted reactants are not almost generated by adjusting an equivalence ratio of the amine-based compound expressed by Chemical Formula 1 during the preparation of the binder.

According to another embodiment of the present invention, an electrode for a secondary battery including an electrode active material, a conductive agent, and the electrode binder for a secondary battery of the present invention is provided.

The electrode for a secondary battery may be prepared by coating an electrode current collector with an electrode active material slurry including an electrode active material, a conductive agent, and the electrode binder for a secondary battery of the present invention. The electrode for a secondary battery may be both anode and cathode using a cathode active material including a lithium transition metal compound. However, the electrode for a secondary battery, for example, may be an anode.

Specifically, in the case that the electrode for a secondary battery of the present invention is an anode, the anode collector is not particularly limited so long as it has conductivity without causing adverse chemical changes in the batteries. The anode collector, for example, may be formed of at least anyone of stainless steel, nickel, copper, titanium, and an alloy thereof, and may have a thickness of 3 µm to 500 µm.

Also, the electrode active material may be an anode active material including a least one of a silicon (Si)-based active material and a carbon-based active material.

Specifically, the Si-based active material may be at least one material selected from the group consisting of Si, $SiO_x$ ($0<x<2$), and a Si—Z alloy (Z is an element selected from the group consisting of magnesium (Mg), calcium (Ca), strontium (Sr), barium (Ba), radium (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), germanium (Ge), phosphorous (P), arsenic (As), antimony (Sb), bismuth (Bi), sulfur (S), selenium (Se), tellurium (Te), polonium (Po), and a combination thereof). Specifically, the Si-based active material may be $SiO_x$.

Also, the carbon-based active material is not particularly limited so long as the intercalation and deintercalation of lithium ions may occur, and the carbon-based active material may be formed of a crystalline carbon-based compound, an amorphous carbon-based compound, or a mixture thereof. A typical example of the crystalline carbon-based compound may be graphite, and the graphite-based crystalline carbon, for example, may include natural graphite and artificial graphite which have good output characteristics and rate characteristics. Furthermore, the amorphous carbon-based compound is a material in which carbon atoms have an amorphous structure, and for example, may include at least one of soft carbon (low-temperature sintered carbon) or hard carbon, mesophase pitch carbide, and fired coke.

Specifically, a content ratio of the Si-based active material to the carbon-based active material may be in a range of 1:2 to 1:9. In the case that the content ratio is 2 or less, since volume expansion of the electrode is excessive due to an increase in the amount of Si, a desired binder effect may not be obtained. In the case in which the content ratio is 9 or more, the amount of Si is low, and thus, a battery having high energy density may be difficult to be prepared. Therefore, when the amount of the carbon layer is within the above range, electrical conductivity of a lithium secondary battery including the anode active material may be improved.

Also, the conductive agent is used for providing conductivity to the electrode, wherein any material may be used so long as it is an electronically conductive material without causing adverse chemical changes in the batteries. For example, the conductive agent may be used by mixing conductive materials such as: graphite such as natural graphite and artificial graphite; carbon black such as acetylene black, Ketjen black, channel black, furnace black, lamp black, and thermal black; carbon nanotubes (CNT); conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent, as a component for further improving the conductivity of the electrode active material, may be included in an amount of 1 wt % to 10 wt % based on a total weight of the electrode active material.

In the anode for a secondary battery of the present invention, the electrode binder for a secondary battery of the present invention may be included in an amount of 1 wt % to 20 wt % based on a total weight of the anode active material. In the case that the amount of the binder is less than 1 wt %, the adhesion between the electrode active material and the current collector may not be sufficient, and in the case in which the amount of the binder is greater than 20 wt %, the amount of the electrode active material is decreased, and thus, capacity and resistance of the battery may be increased.

Also, the electrode active material slurry may further selectively include a second binder, a thickener, or a filler.

The second binder is a component that assists the binding between the anode active material using a transition metal oxide and the conductive agent, and the binding with the current collector, and an organic-based binder, a water-based binder, or a combination thereof may be used as the second binder. The organic-based binder denotes a binder dissolved or dispersed in an organic solvent, in particular, N-methyl pyrrolidone (NMP), and the water-based binder denotes a binder using water as a solvent or a dispersion medium. Examples of the binder may be polyvinylidene fluoride (PVDF), polyvinyl alcohol, starch, hydroxypropyl cellulose, regenerated cellulose, polyvinylpyrrolidone, polyimide, polyamideimide, polyethylene, polypropylene, an ethylene-propylene-diene terpolymer (EPDM), a sulfonated EPDM, a styrene-butadiene rubber, a fluorine rubber, and a combination thereof. However, the present invention is not limited thereto.

The thickener may include carboxymethyl cellulose (CMC). Also, the filler, as a component to inhibit expansion of the electrode, is selectively used. The filler is not particularly limited so long as it does not cause adverse chemical changes in the batteries and is a fibrous material. Examples of the filler may include olefin-based polymers such as polyethylene and polypropylene; and fibrous materials such as glass fibers and carbon fibers.

Amounts of the binder and the filler may be properly and selectively included within a range that does not decrease the performance of the electrode.

The electrode active material slurry may include water; alcohols such as ethanol, propanol, and butanol; ketones such as acetone and phenyl ethyl ketone; ethers such as methyl ethyl ether, diethyl ether, and diisoamyl ether; lactones such as γ-butyrolactone; and lactams such as β-lactam, as a solvent, and for example, water may be used among the above solvents.

Also, the electrode active material slurry may be coated using a typical method known in the art. For example, various methods, such as dip coating, die coating, roll coating, comma coating, or a mixed method thereof, may be used. Furthermore, a base material formed of a current collector, such as a metal thin film, a mesh-type expanded metal, and a punched metal, is directly coated with the electrode active material slurry and then dried to form an electrode, or a base material formed of a separate support, such as a polyethylene terephthalate film, is coated with the electrode active material slurry and dried, and an electrode may then be formed by laminating films detached from the support on the current collector.

Also, according to an embodiment of the present invention, a lithium secondary battery having improved cycle characteristics by including a cathode, a separator, the anode for a secondary battery of the present invention, and a non-aqueous electrolyte may be provided.

The separator is disposed between the cathode and the anode, and a thin insulating film having high ion permeability and mechanical strength is used. The separator typically has a pore diameter of 0.01 μm to 10 μm and a thickness of 5 μm to 300 μm.

For example, sheets or non-woven fabrics formed of an olefin-based polymer such as polypropylene; glass fibers or polyethylene, which have chemical resistance and hydrophobicity, are used as the separator. When a solid electrolyte, such as a polymer, is used as an electrolyte, the solid electrolyte may also serve as the separator.

Also, the present invention may provide a medium- and large-sized battery pack including the plurality of lithium secondary batteries that are electrically connected to one another. The medium- and large-sized battery pack may be used as a power source of one or more medium- and large-sized devices selected from the group consisting of power tool; an electric vehicle (EV) including an electric car, a hybrid electric vehicle (HEV), and a plug-in hybrid electric vehicle (PHEV); an electric truck; an electric commercial vehicle; and a power storage system.

Hereinafter, the present invention will be described in detail, according to examples and comparative examples. However, the following examples are merely presented to exemplify the present invention, and the scope of the present invention is not limited thereto.

EXAMPLES

Example 1

Preparation of Electrode Binder for Secondary Battery (1)

No Purification after Coupling Reaction 11.51 mg (0.1 mmol) of NHS and 19.17 mg (0.1 mmol) of EDC as a coupling agent, and styrene-butadiene rubber binder particles (SBR478, AD-B02, particle diameter of 400 nm) including a carboxyl group as an end group, as water-based binder particles, were dissolved in a distilled water-based weak acidic solution, and then stirred for 3 hours to activate the end carboxyl group of the styrene-butadiene rubber. Subsequently, 19 mg (0.1 mmol) of an amine-based compound expressed by Chemical Formula 1 was dissolved in a distilled water-based buffer solution and then reacted with the carboxyl group-activated water-based binder particle solution (10 ml) for 8 hours to prepare water-based binder particles (crude) to which the amine-based compound expressed by Chemical Formula 1 is coupled. It was confirmed that the water-based binder particles thus prepared had a uniform average particle size distribution of 0.5 μm to 1 μm (see FIG. 1A).

(Preparation of Anode and Cell)

A SiO/C anode active material (KSC1040:graphite=33:67, weight ratio), a mixture (weight ratio of 7:3) of the water-based binder particles (crude) to which the amine-based compound expressed by Chemical Formula 1 is coupled and CMC as a thickener, and a conductive agent (CNT) were mixed at a weight ratio of 92:3:5 in a solvent (water) to prepare an anode active material slurry. An anode was prepared by performing a typical electrode preparation process of coating a Cu-foil current collector with the anode active material slurry.

Also, a coin half-cell battery was prepared using the anode.

Example 2

Preparation of Electrode Binder for Secondary Battery

Including Purification Step After Coupling Reaction

An anode and a coin half-cell battery were prepared in the same manner as in Example 1 except that purifying a mixture solution containing unreacted reactants remained after the preparation of the coupled water-based binder particles was further performed before the preparation of the anode. In this case, the purifying was performed by a centrifugation method. Specifically, the centrifugation method was performed by including the steps of concentrating the final volume of the mixture solution to 2 ml by centrifugation at 12,000 rpm for 20 minutes, removing a supernatant and redispersing pellets precipitated at the bottom by adding about 10 ml of a weak acidic buffer solution, concentrating the final volume of the mixture solution to 2 ml by re-centrifugation at 12,000 rpm for 20 minutes, and then removing a supernatant and redispersing pellets precipitated at the bottom in 2 ml of distilled water. With respect to water-based binder particles prepared by including the purifying, it was confirmed that a non-uniform particle size distribution of about 0.5 μm to about 1 μm and about 50 μm to about 500 μm was obtained, different from the non-purified water-based binder particles (see FIG. 1B).

Comparative Example 1

Preparation of Anode

A SiO/C anode active material (KSC1040:graphite=33:67, weight ratio), a mixture (7:3) of a non-surface-modified water-based binder (SBR) and CMC as a binder, and a conductive agent (CNT) were mixed at a weight ratio of 92:3:5 in a solvent (water) to prepare an anode active material slurry. An anode was prepared by performing a typical electrode preparation process of coating a Cu-foil current collector with the anode active material slurry.

Also, a coin half-cell battery was prepared using the anode.

Comparative Example 2

An anode and a coin half-cell battery were prepared in the same manner as in Comparative Example 1 except that non-surface-modified water-based binder particles were used after going through a purification (centrifugation) process. In the case that the centrifugation process was performed on the non-surface-modified water-based binder particles, it may be confirmed that agglomeration effects occurred, similar to the case of the water-based binder particles of Example 2.

Experimental Examples

Experimental Example (1)

Peeling tests were performed on the anodes respectively prepared in Example 1 and Comparative Examples 1 and 2, and the results (peeling force values) thereof are presented in Table 1 below.

TABLE 1

| | Peeling force (gF) | Average peeling force (gF) |
|---|---|---|
| Example 1 | 88.2 | 87.0 |
| | 85.8 | |
| Comparative Example 1 | 76.5 | 80.5 |
| | 84.5 | |
| Comparative Example 2 | 75.0 | 61.1 |
| | 47.1 | |

* It is noted that the greater the peeling force values are, the higher the bonding force between the electrode current collector and the electrode active material slurry.

As illustrated in Table 1, it may be confirmed that the peeling force of the anode prepared in Example 1 of the present invention was improved by about 108% based on the peeling force (100%) of the anode of Comparative Example 1 and about 142.2% based on the peeling force (100%) of the anode of Comparative Example 2.

That is, in the case that the surfaces of the water-based binder particles are modified using the compound expressed by Chemical Formula 1 as in the present invention, it may be understood that the dispersibility of the binder in the electrode slurry may not only be increased, but binding properties between the electrode current collector and the electrode active material slurry may also be improved.

Experimental Example (2)

Cycle efficiency of each battery respectively prepared in Example 1 and Comparative Example 1 was measured under continuous charging and discharging conditions. In this case, the charging and discharging were performed under a cyclic condition of initial charging at 0.1 C, discharging at 0.1 C followed by charging at 0.5 C, and discharging at 1.0 C.

Figure 2A:
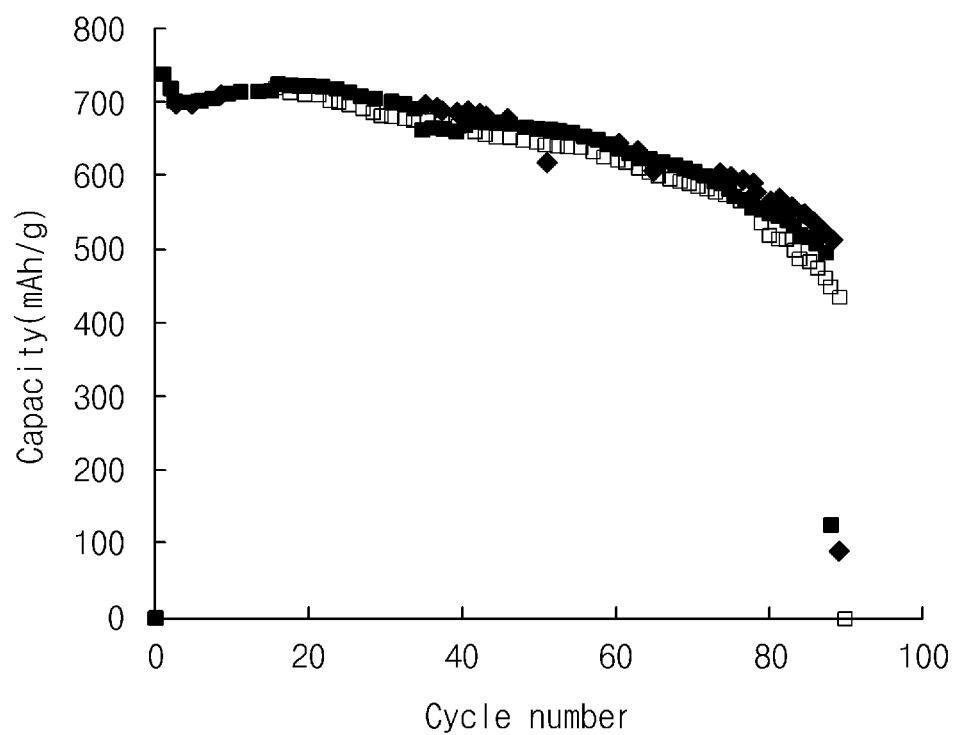
FIG. 2A is a graph illustrating the results of measuring cycle life characteristics of a secondary battery cell prepared in Example 1 according to the present invention.
Figure 2B:
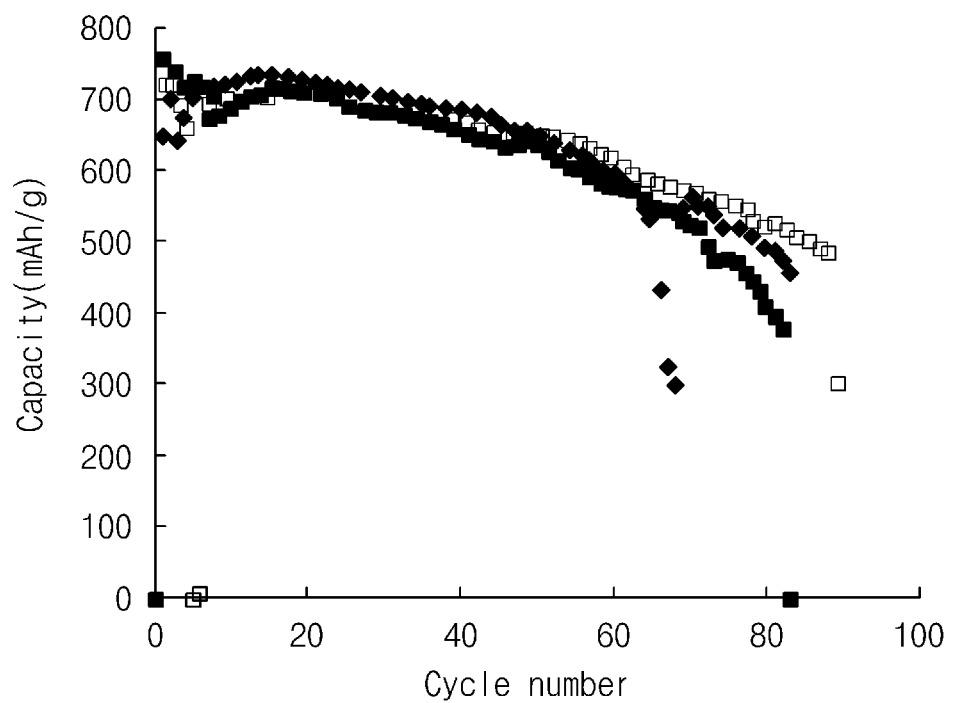
FIG. 2B is a graph illustrating the results of measuring cycle life characteristics of a secondary battery cell prepared in Comparative Example 1.

When remaining capacity and capacity retention ratio after 40 cycles were compared, the coin half-cell battery of Example 1 had values of 674.9 mAh/g and 96.6%, but the coin half-cell battery of Comparative Example 1 had values of 668.4 mAh/g and 93.7%. Also, when remaining capacity and capacity retention ratio after 80 cycles were compared, the coin half-cell battery of Example 1 had values of 536.1 mAh/g and 78.3%, but the coin half-cell battery of Comparative Example 1 had values of 492.1 mAh/g and 71.8% (see FIGS. 2A and 2B). According to the above results, the battery of Comparative Example 1 exhibited a tendency that variation in the above values was large and continuously decreased as the number of cycles increased. In contrast, it may be confirmed that overall cycle life characteristics of the battery of Example 1 were good.

According to the present invention, since surfaces of water-based binder particles including at least one of carboxyl group as an end group are surface-modified with an amine-based compound expressed by Chemical Formula 1, an electrode binder for a secondary battery of the present invention having improved adhesion may be prepared. Also, since the electrode binder for a secondary battery of the present invention is used, the exfoliation of an electrode active material from a current collector during repetitive charge and discharge operations may be prevented. Thus, an anode for a secondary battery having improved cycle efficiency and a lithium secondary battery including the same may be prepared.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrode binder for a secondary battery comprising water-based binder particles,
    wherein the water-based binder particles comprise a polymer compound including at least one repeating structural unit composed of a vinyl group as well as at least one carboxyl group disposed on surfaces as an end group,
    wherein the carboxyl group disposed on the surfaces of the water-based binder particles is coupled with an amine-based compound expressed by Chemical Formula 1, and
    wherein the polymer compound including the repeating structural unit composed of a vinyl group is a styrene-butadiene rubber;

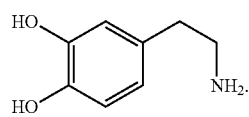

[Chemical Formula 1]

2. The electrode binder for a secondary battery of claim 1, wherein a diameter of the water-based binder particles is in a range of 300 nm to 500 nm.

3. The electrode binder for a secondary battery of claim 1, wherein a combination ratio (number) of the water-based binder particles : the amine-based compound expressed by Chemical Formula 1 that is coupled to the water-based binder particles is in a range of 1:4,000 to 1:6,000.

4. The electrode binder for a secondary battery of claim 1, wherein the amine-based compound expressed by Chemical Formula 1 that is coupled to the water-based binder particles is included in an amount of 8 wt % to 10 wt % based on a total weight of monomers constituting the water-based binder particles.

5. An anode for a secondary battery comprising:
    an electrode active material;
    a conductive agent; and
    the electrode binder for a secondary battery of claim 1.

6. The anode for a secondary battery of claim 5, wherein the electrode active material is an anode active material including a least one of a silicon (Si)-based active material and a carbon-based active material.

7. The anode for a secondary battery of claim 6, wherein the carbon-based active material is formed of a crystalline carbon-based compound, an amorphous carbon-based compound, or a mixture thereof.

8. The anode for a secondary battery of claim 5, wherein the electrode binder for a secondary battery is included in an amount of 1 wt % to 20 wt % based on a total weight of the electrode active material.

9. A lithium secondary battery comprising:
    the anode for a secondary battery of claim 5;
    a cathode;
    a separator disposed between the anode and the cathode; and
    a non-aqueous electrolyte.

10. A method of preparing the electrode binder for a secondary battery of claim 1, the method comprising:
    reacting a coupling agent with water-based binder particles including at least one carboxyl group as an end group in a weak acidic solution to activate the carboxyl group of the water-based binder particles;
    dissolving an amine-based compound expressed by Chemical Formula 1 in a distilled water-based buffer solution; and
    mixing the carboxyl group-activated water-based binder particles and the solution of the amine-based compound expressed by Chemical Formula 1 to prepare water-based binder particles to which the amine-based compound expressed by Chemical Formula 1 is coupled

[Chemical Formula 1]

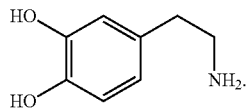

11. The method of claim 10, wherein the coupling agent comprises 1-ethyl-3 -(3-dimethylaminopropyl)-carbodiimide (EDC) and N-hydroxysuccinimide (NHS).

12. The method of claim 10, wherein a mixing molar ratio of the coupling agent: the amine-based compound expressed by Chemical Formula 1 is in a range of 1:1 to 2:1.

13. The method of claim 10, wherein the mixing of the carboxyl group-activated water-based binder particles and the solution of the amine-based compound expressed by Chemical Formula 1 is performed under weak acidic conditions using water as a reaction solvent.

14. The method of claim 10, wherein 0.1 mmol of the solution of the amine-based compound expressed by Chemical Formula 1 is mixed with 10 ml of the carboxyl group-activated water-based binder particle solution, and
   this corresponds to a concentration at which 4,000 to 6,000 molecules of the compound of Chemical Formula 1 are coupled to one water-based binder particle.

\* \* \* \* \*